United States Patent [19]

Sakurai et al.

[11] 4,335,229

[45] Jun. 15, 1982

[54] PROCESS FOR POLYMERIZING AN α-OLEFIN

[75] Inventors: Hisaya Sakurai; Yoshihiko Katayama; Tadashi Ikegami; Masayasu Furusato, all of Kurashiki, Japan

[73] Assignee: Asahi Kasei Kogyo Kabushiki Kaisha, Osaka, Japan

[21] Appl. No.: 177,546

[22] Filed: Aug. 13, 1980

[30] Foreign Application Priority Data

Sep. 25, 1979 [JP] Japan .............................. 54-123015
Sep. 28, 1979 [JP] Japan .............................. 54-124912

[51] Int. Cl.³ .......................... C08F 4/64; C08F 10/00
[52] U.S. Cl. ............................... 526/122; 252/429 B; 252/429 C; 252/431 R; 526/125; 526/127; 526/128; 526/133; 526/137; 526/149; 526/150; 526/339; 526/348; 526/348.2; 526/348.5; 526/348.4; 526/348.6; 526/348.7
[58] Field of Search ..................... 252/429 B, 429 C; 526/122, 125, 127, 128, 133, 137, 149, 150

[56] References Cited

U.S. PATENT DOCUMENTS

| | | | |
|---|---|---|---|
| 4,115,319 | 9/1978 | Scata et al. | 526/125 |
| 4,159,965 | 7/1979 | Sakurai et al. | 526/125 |
| 4,189,553 | 2/1980 | Birkilbach | 526/144 |
| 4,224,186 | 9/1980 | Lowery et al. | 526/150 |

Primary Examiner—Edward J. Smith
Attorney, Agent, or Firm—Sprung, Horn, Kramer & Woods

[57] ABSTRACT

A process for polymerizing an α-olefin comprising contacting the olefin in liquid phase at a temperature of about 120° to about 320° C. with a catalyst comprising a component (A) and an organometal component (B), the component (A) being produced by reacting a hydrocarbon-soluble organomagnesium component (i) of the formula,

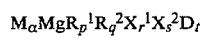

$$M_\alpha MgR^1_p R^2_q X^1_r X^2_s D_t$$

wherein

α, p, q, r and s each independently is 0 or a number greater than 0, t is a number greater than 0, $p+q+r+s = m\alpha + 2$, $0 \leq (r+s)/(\alpha+1) < 2$, m is the valance of M, M is a metal of the 1st to 3rd groups of the Periodic Table, $R^1$ and $R^2$ each independently is a hydrocarbon group having 1 to 20 carbon atoms, $X^1$ and $X^2$ each independently is a hydrogen atom, a halogen atom or an organic electronegative group containing O, N, or S, D is an electron donor, with (ii) a halide of boron, silicon, germanium, tin, phosphorus, antimony, bismuth or zinc, and contacting the product of (i)+(ii) with (iii) a compound of titanium and/or a compound of vanadium at a concentration of titanium plus vanadium of at most about 2 mols per liter of the inert reaction solvent, the atomic ratio of Mg/(Ti+V) in (A) being about 3 to about 500.

40 Claims, No Drawings

PROCESS FOR POLYMERIZING AN α-OLEFIN

BACKGROUND OF THE INVENTION

1. Field of the Invention

This invention relates to a process for polymerizing an α-olefin in liquid phase using a novel catalyst.

2. Description of the Prior Art

It is known that solution polymerization is suitable for the production of polyethylene and its advantages are as follows;

(1) The polymerization of ethylene is an exothermic reaction and removal of heat is a big problem from the viewpoint of a process. Since the efficiency of removing heat increases with greater differences between the inner temperature of a reactor and that of a cooling jacket, solution polymerization in which a high polymerization temperature is employed is advantageous from this point.

(2) The degree of polymerization of ethylene, i.e. the molecular weight of polyethylene can be controlled comparatively accurately by varying the polymerization temperature and furthermore, the control of the molecular weight of polyether can be done by using a small amount of hydrogen.

(3) Since the molecular weight of polyethylene is correlated with the viscosity of the reaction solution, it can be estimated by measurement of the viscosity of the reaction solution in the reactor and the control of the molecular weight of polyethylene can be quickly done accordingly.

(4) Polyethylene is used or sold usually in the form of pellets. The polyethylene obtained by suspension polymerization and gas phase polymerization is powdery and it is necessary to melt-mold the powdery polyethylene into pellets by an extruder. On the other hand, according to solution polymerization it is possible to remove the polymerization solvent by evaporation with the use of the heat of polymerization and to introduce the polyethylene in its melt form into an extruder. As a result, excess step and heat for melting the polyethylene can be omitted. In order to make the most of this advantage, it is preferred that the polymerization temperature is high.

(5) In producing low density polyethylene by copolymerization of ethylene and an α-olefin by a slurry method, the formed polymer becomes easily soluble in the polymerization solvent and the polymerization reaction mixture in the reactor becomes gruel, resulting in a difficulty in continuing polymerization. Accordingly, it is difficult to produce polyethylene having a density less than about 0.945. On the other hand, according to solution polymerization, polymerization is conducted at high temperatures in the form of a complete solution without the above described problem and thus it is possible to produce polyethylene having a wide range of density from about 0.975 to about 0.910.

The disadvantage of solution polymerization is an increase in the solution viscosity due to the increase in the solution concentration or the molecular weight of polyethylene, which renders commercial scale production of polyethylene difficult. In order to avoid this disadvantage, it is necessary that the polymerization temperature is raised and simultaneously the solution viscosity is reduced. However, with increased polymerization temperatures the catalyst efficiency is decreased and a large amount of catalyst residue remains in the formed polyethylene and causes discoloration of the polyethylene and deterioration of molded articles obtained therefrom. Further, removal of catalyst residue is difficult. Thus, there are required catalysts having a high catalyst efficiency at high temperatures which enable complete omission of the catalyst removal step due to a small amount of catalyst residue present in the formed polyethylene.

There are known many Ziegler type catalysts having a high catalyst efficiency for suspension polymerization (see, e.g. U.S. Pat. Nos. 4,115,319, 4,159,965 and 4,163,831). However, the catalyst efficiency of these catalysts is, in general, decreased with increased polymerization temperatures, and especially at temperatures higher than about 150° C., the decrease in the catalyst efficiency is remarkable. Thus the performances of such catalysts are not enough to omit the removal step of catalyst residue when employed in solution polymerization.

There are also known catalysts for solution polymerization of an olefin which comprise an organomagnesium complex, an aluminum halide, hydrogen chloride, a halogenated secondary or tertiary alkyl or halogenated silicon compound and a titanium compound (see, e.g., U.S. Pat. Nos. 4,159,965 and 4,172,050 and U.K. Patent Nos. 1,251,177 and 1,235,062). These catalysts have a higher catalyst efficiency than the conventional catalysts but their catalyst efficiency at high temperatures is still insufficient.

As a result of the study on the catalyst system for solution polymerization it had been discovered that by using, as a catalyst, a component having been obtained by reacting a specific organomagnesium compound with a halide and contacting the obtained product with a titanium compound and/or a vanadium compound, in combination with an organometal component, there can be obtained catalysts having a very high catalyst efficiency without any decrease at least at 150° C., especially at least at 180° C., and an excellent storage stability suitable for the polymerization of an olefin.

SUMMARY OF THE INVENTION

According to this invention there is provided a process for polymerizing an α-olefin comprising contacting the olefin in liquid phase at a temperature of about 120° to about 320° C. with a catalyst comprising a component (A) and an organometal component (B), the component (A) being produced by reacting a hydrocarbon-soluble organomagnesium component (i) of the formula

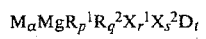

wherein

α, p, q, r and s each independently is 0 or a number greater than 0, t is a number greater than 0, p+q+r+s=mα+2, $0 \leq (r+s)/(\alpha+1) < 2$, m is the valence of M, M is a metal of the 1st to 3rd groups of the Periodic Table, $R^1$ and $R^2$ each independently is a hydrocarbon group having 1 to 20 carbon atoms, $X^1$ and $X^2$ each independently is a hydrogen atom, a halogen atom or an organic electronegative group containing 0, N or S, D is an electron donor, with (ii) a halide of boron, silicon, germanium, tin, phosphorus, antimony, bismuth or zinc, and contacting the product or (i)+(ii) with (iii) a compound of titanium and/or a compound of vanadium at a concentration of titanium plus vanadium of at most about 2 mols per liter of the inert reaction solvent, the atomic ratio of Mg/(Ti+V) in (A) being about 3 to 500.

One of the characteristic features of this invention is a high catalyst efficiency which reaches at least 500 Kg/g(Ti+V) as will be illustrated by the Examples. Accordingly, the step of removing catalyst residue can be omitted.

Another characteristic feature of this invention is that the catalyst of this invention is stable at high temperatures and the catalyst efficiency reaches 500 Kg/g(Ti+V) at a temperature of 180° C. or higher than 180° C.

Still another characteristic feature of this invention is that there can be obtained polymers having a narrow molecular weight distribution, a high molecular weight and a high rigidity suitable for injection molding.

A further characteristic feature of this invention is that there can be also obtained polymers having a broad molecular weight distribution suitable for extrusion molding by multistage polymerization having a plurality of polymerization zones where the polymerization conditions such as the temperature and the concentration of hydrogen as the temperature and the concentration of hydrogen are varied.

A still further characteristic feature of this invention is that polyethylene having a wide range of density of from about 0.975 to about 0.910 can be easily obtained.

DETAILED DESCRIPTION OF THE INVENTION

The organomagnesium component (i) which can be used in preparing the catalyst component (A) is a complex of an organomagnesium compound represented by the formula,

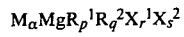

$$M_\alpha MgR_p^1 R_q^2 X_r^1 X_s^2$$

wherein

M, $R^1$, $R^2$, $X^1$, $X^2$, $\alpha$, p, q, r and s are the same as defined above,
with an electron donor represented by D, and the organomagnesium compound includes dihydrocarbyl magnesium $R_2Mg$ wherein R is a hydrocarbon group and complexes of dihydrocarbyl magnesium with other organometal compounds.

In this formula, $R^1$ and $R^2$ each independently is a hydrocarbon group having 1 to 20 carbon atoms. Exemplary hydrocarbon groups include alkyl groups such as methyl, ethyl, propyl, butyl, amyl, hexyl and decyl groups; cycloalkyl groups such as cyclohexyl group; aryl groups such as phenyl group; and aralkyl groups such as benzyl group. Of these groups, alkyl groups are preferred. M is a metal of the 1st to 3rd groups of the Periodic Table. Exemplary metals represented by M include lithium, sodium, potassium, beryllium, calcium, strontium, barium, zinc, boron and aluminum. Of these metals, lithium, beryllium, boron, aluminum and zinc are preferred due to their ease in making hydrocarbon-soluble organomagnesium complexes. A more preferred metal is aluminum. The atomic ratio of M to Mg, i.e., $\alpha$ may be widely varied but it is preferred to employ the hydrocarbon-soluble organomagnesium complex in which $\alpha$ is 0 to 1.5. It is more preferred to employ the organomagnesium compound in which $\alpha$ is 0 to 1. $X^1$ and $X^2$ each independently is a hydrogen atom or an organic electronegative group containing O, N or S. Exemplary organic electronegative groups include $OR^3$, $OSiR^4R^5R^6$, $NR^7R^8$ and $SR^9$ groups wherein $R^3$, $R^7$, $R^8$ and $R^9$ each independently is a hydrocarbon group having 1 to 15 carbon atoms and $R^4$, $R^5$ and $R^6$ each independently is a hydrogen atom or a hydrocarbon group having 1 to 15 carbon atoms. Exemplary hydrocarbon groups include alkyl groups such as methyl, ethyl, propyl, butyl, amyl, hexyl and decyl groups; cycloalkyl groups such as cyclohexyl group; aryl groups such as phenyl group; and aralkyl groups such as benzyl group. Of these organic electronegative groups, $OR^3$ and $OSiR^4R^5R^6$ are preferred. More preferred organic electronegative groups are $OR^3$ and $OSiR^4R^5R^6$ wherein $R^3$, $R^4$, $R^5$ and $R^6$ each independently is an alkyl group having 1 to 10 carbon atom or at least one of $R^4$, $R^5$ and $R^6$ is a hydrogen atom and the remaining are alkyl groups having 1 to 10 carbon atoms. $\alpha$, p, q, r and s each independently is 0 to a number greater than 0 and the relationship of $p+q+r+s = m\alpha+2$ wherein m is the valence of M is satisfied. This relationship shows stoichiometry between the valence of M plus Mg and the substituents. The range of $0 \leq (r+s)/(\alpha+1) < 2$ designates that a total number of $X^1$ and $X^2$ per total number of M and Mg is 0 to 2. It is preferred to employ the range of $0 < (r+s)/(\alpha+1) \leq 1$ when $X^1$ and $X^2$ are halogen atoms.

In general, organomagnesium compounds are insoluble in an inert hydrocarbon but those with $\alpha > 0$ are soluble in an inert hydrocarbon. In this invention it is essential that the organomagnesium compounds are soluble in an inert hydrocarbon. Also organomagnesium compounds with $\alpha = 0$ such as $(sec-C_4H_9)_2Mg$, $(C_2H_5)Mg(n-C_4H_9)$ and $(n-C_6H_{12})_2Mg$ are soluble in an inert hydrocarbon and accordingly, can be used in this invention with good results.

The organomagnesium compounds can be prepared by reacting a compound of $R^1MgQ$ or $R_2^1Mg$ wherein $R^1$ is the same as defined above and Q is a halogen atom, with an organometal compound of $MR_m^2$, $MR_a^2X_b^1X_c^2$ or $MQ_aX_b^1X_c^2$ wherein M, $R^2$, $X^1$, $X^2$, Q and m are the same as defined above and $a+b+c=m$, in an inert hydrocarbon medium such as hexane, heptane, octane, cyclohexane, benzene and toluene at a temperature of about 0° C. to about 150° C., and, if necessary or if desired, further reacting the resulting reaction product with an alcohol, siloxane, amine, imine, thiol or a dithio compound. Furthermore, the organomagnesium compound can be prepared by reacting a compound of $MgX_2^1$ or $R^1MgX^1$ with a compound of $MR_m^2$ or $MR_i 1_2H$ or by reacting a compound of $R^1MgX^1$ or $R_2^1Mg$ with a compound of $R_n^2MX_{m-n}^2$ or $X_d^1MX_{m-d}^2$ wherein M, $R^1$, $R^2$, $X^1$, $X^2$ and m are the same as defined above and a and n each independently is a nubmer of 0 to m.

The electron donor represented by D is an electron donative organic compound containing O, N, S or P. Exemplary electron donors used in this invention include ethers such as diethyl ether, dibutyl ether, diisoamyl ether, ethylene glycol dimethyl ether, diethylene glycol dimethyl ether, glycerol trimethyl ether, vinyl methyl ether, tetrahydrofuran, dioxane, crown ether and propylene oxide; siloxanes such as hexamethyldisiloxane, sym-dihydrotetramethyldisiloxane, pentamethyltrihydrotrisiloxane, methylhydrocyclotetrasiloxane, methylhydropolysiloxane, dimethylpolysiloxane and phenylhydropolysiloxane; tertiary amines such as triethylamine, tributylamine, tetramethylethylenediamine, bis(diethylamino)methane, and diazabicyclooctane; nitriles such as acetonitrile, propionitrile, acrylonitrile, benzylnitrile and benzonitrile; amides such as dimethylformamide and hexamethylphosphoric triamide; pyridines such as pyridine and methylpyridine; thioethers such as diethyl sulfide, ethylpropyl sulfide, dipropyl sulfide and ethylene sulfide; sulfoxides such as dimethyl sulfoxide, diethyl sulfoxide and dibutyl sulfoxide; phosphines such as triethylphosphine and triphenylphosphine and esters such as ethyl benzoate and ethyl acetate. Of these compounds, ethers, siloxanes and amines are preferred. More preferred are siloxanes.

The suffix t designates the amount of the electron donor coordinated with M or Mg and represents a number greater than zero. In order to obtain a high catalyst efficiency at high temperatures, it is important that the electron donor is coordinated with M or Mg. A preferred t ranges from about 0.05 to about 10, and a more preferred t ranges from about 0.2 to about 2. When $X^1$ or $X^2$ is a halogen atom, it is preferred that $t/(r+s)$ is at least 1.

The complex of the organomagnesium compound with the electron donor can be easily prepared by contacting the organomagnesium compound with the electron donor at a temperature of about $-20°$ C. to about $100°$ C. in such an inert hydrocarbon medium as employed in the preparation of the organomagnesium compound.

The halides (ii) of boron, silicon, germanium, tin, phosphorus, antimony, bismuth or zinc which can be employed are the compounds having at least one halogen atom. Preferred halides are the chlorides. Exemplary halides include boron trichloride, diethylboron chloride, dibutylboron chloride, ethylboron dichloride, butylboron dichloride, ethoxyboron dichloride, methylchlorosilane, methyldichlorosilane, trichlorosilane, methyltrichlorosilane, dimethylchlorosilane, dimethyldichlorosilane, trimethylchlorosilane, ethyldichlorosilane, ethyltrichlorosilane, diethylchlorosilane, diethyldichlorosilane, triethylchlorosilane, vinyltrichlorosilane, vinyldichlorosilane, propyltrichlorosilane, propyldichlorosilane, allyltrichlorosilane, butyltrichlorosilane, butyldichlorosilane, sym-tetramethyldichlorosilane, octyldichlorosilane, decyldichlorosilane, hexachlorodisilmethylene, hexachlorocyclotrisilmethylene, phenyltrichlorosilane, phenyldichlorosilane, benzyltrichlorosilane, tetrachlorosilane, ethoxytrichlorosilane, diethoxydichlorosilane, butoxydichlorosilane, octoxytrichlorosilane, tetrachlorogermane, methyltrichlorogermane, dimethyldichlorogermane, trimethylchlorogermane, ethyltrichlorogermane, butyltrichlorogermane, tin tetrachloride, methyltrichlorotin, diethyldichlorotin, dibutoxydibutyltin, trioctylchlorotin, phosphorus trichloride, phosphorus pentachloride, ethyldichlorophosphine, propyldichlorophosphine, methyldichlorostibine, trimethylantimony dichloride, tripropylantimony dichloride, methyldichlorobismuthine, ethyldichlorobismuthine, butyldichlorobismuthine, dimethylchlorobismuthine, zinc chloride, ethylzinc chloride and butylzinc chloride. Of these compounds, chlorides of boron, silicon or germanium are preferred in order to obtain a high catalyst efficiency at a polymerization temperature of at least $180°$ C. More preferred compounds are chlorosilanes.

The compounds (iii) of titanium and the compounds (iii) of vanadium which can be employed include halides, oxyhalides, alkoxyhalides, alkoxides and oxyalkoxides of titanium or vanadium such as titanium tetrachloride, titanium tetrabromide, titanium tetraiodide, ethoxytitanium trichloride, propoxytitanium trichloride, butoxytitanium trichloride, dipropoxytitanium dichloride, dibutoxytitanium dichloride, tripropoxytitanium monochloride, tributoxytitanium monochloride, tetrapropoxytitanium, tetrabutoxytitanium, vanadium tetrachloride, vanadyl trichloride, monobutoxyvanadyl dichloride, dibutoxyvanadyl monochloride, tributoxyvanadyl and, ethoxytrichlorovanadium and any mixture thereof. It is preferred to employ a mixture or reaction product of the compound of titanium and the compound of vanadium which have at least one halogen atom such as chlorine atom. In this case it is preferred that the mol ratio of the compound of titanium to the compound of vanadium is about 0.1 to about 10. A more preferred mol ratio ranges from about 0.2 to about 5.

The reaction of the hydrocarbon-soluble organomagnesium component (i), the halide (ii) and the compound (iii) can be conducted in an inert reaction medium or solvent. Exemplary inert reaction solvents employed in this invention include aliphatic hydrocarbons such as hexane, heptane and octane; aromatic hydrocarbons such as benzene and toluene; alicyclic hydrocarbons such as cyclohexane and cyclomethylhexane; and any mixtures thereof. It is preferred from the viewpoint of the catalyst performances that aliphatic hydrocarbons are employed. With the order of the reaction of these components (i), (ii) and (iii), previous contact of the component (i) with the compound (iii) should be avoided in order for the catalyst to exhibit its high activity. More specifically, the surprising effect of this invention can be accomplished by firstly reacting the component (i) with the halide (ii) to form a solid product and secondly contacting the compound (iii) with the surface of the solid product effectively.

The reaction between the component (i) and the halide (ii) may be carried out by adding these two components into a reaction zone at the same time or by firstly charging one of them into the reaction zone and secondly adding the other into the reaction zone. The reaction temperature was not particularly limited and typically ranges from about $-50°$ C. to about $150°$ C. A preferred reaction temperature ranges from about $0°$ C. to about $100°$ C. from the viewpoint of the progress of reaction. The mol ratio of the halide (ii) to the component (i) which can be employed in this invention is not particularly limited and typically ranges from about 0.001 to about 100. A preferred mol ratio of the halide (ii) to the component (i) ranges from about 0.01 to about 20. The solid product obtained by the reaction between the component (i) and the halide (ii) may be usually separated by filtration or washed by decantation and then supplied to the contact with the compound (iii). In order to simplify the reaction procedure, it is preferred that the compound (iii) is added to the reaction solution obtained after completion of the reaction between the component (i) and the halide (ii), and further the contact with the compound (iii) is continued.

In order to impart a high catalyst activity at high temperatures to the catalyst, it is essential to control the amount of the compound (iii) employed and the concentration of the compound (iii) in the reaction solution. The atomic ratio of $Mg/(Ti+V)$ which is used in this invention ranges from about 3 to about 500, and a preferred atomic ratio of $Mg/(Ti+V)$ ranges from about 5 to about 200. A more preferred atomic ratio of Mg/(Ti+V) ranges from about 10 to about 100. The concentration of Ti plus V in the reaction solution used in this invention is at most 2 mols per liter of the inert reaction solvent. A preferred concentration of Ti plus V in the reaction solution ranges from about 0.01 to about 900 mmols per liter of the inert reaction solvent. The temperature for contacting the solid product formed by the reaction between the component (i) and the halide (ii) with the compound (iii) is not particularly limited and typically ranges from about −50° C. to about 150° C., preferably from about 0° C. to about 95° C.

The component (A) of this invention becomes an excellent catalyst for polymerizing an olefin in combination of an organometal component (B).

Exemplary organometal components (B) which can be used in this invention are organoaluminum compound including trialkylaluminums such as $Al(C_2H_5)_3$, $Al(C_3H_7)_3$, $Al(C_4H_9)_3$, $Al(C_5H_{11})_3$, $Al(C_6H_{13})_3$, $Al(C_8H_{17})_3$ and $Al(C_{10}H_{21})_3$, alkylaluminum halides such as $Al(C_2H_5)_2Cl$, $Al(C_2H_5)Cl_2$, $Al(i-C_4H_9)_2Cl$ and $Al(C_2H_5)_2Br$, alkylaluminum alkoxides such as $Al(C_2H_5)_2(OC_2H_5)$ and $Al(i-C_4H_9)_2(OC_4H_9)$, alkylaluminum siloxides such as $Al(C_2H_5)_2(OSiH.CH_3.C_2H_5)$ and $Al(i-C_4H_9[OSi(CH_3)_2.i-C_4H_9]_2$, reaction products of a trialkylaluminum and a conjugated diene such as aluminum isoprenyl and aluminum myrcenyl; organoboron compounds such as trialkylborons such as $B(C_2H_5)_3$, $B(C_3H_7)_3$, $B(C_4H_9)_3$, $B(C_6H_{13})_3$ and $B(C_8H_{17})_3$, triarylborons such as $B(C_6H_5)_3$, alkylboron alkoxides such as $B(C_5H_{11})_2(OC_4H_9)$ and alkylboron halides such as $B(C_7H_{15})_2Cl$; organozinc compounds such as dialkylzincs including $Zn(C_2H_5)_2$, $Zn(C_4H_9)_2$, $Zn(C_6H_{13})_2$, $Zn(C_8H_{17})_2$ and $Zn(C_2H_5)(n-C_3H_7)$, diarylzincs such as $Zn(C_6H_5)_2$ and alkylzinc alkoxides such as $Zn(C_3H_7)(OC_4H_9)$; the same organomagnesium compounds as described above, and any mixtures thereof. Of these organometal compounds, organoaluminum compounds are preferred, and trialkylaluminums and alkylaluminum halides are more preferred.

The component (A) and the organometal component (B) may be added under the polymerization conditions to the polymerization system or may be combined prior to the polymerization.

The mol ratio of the organometal component (B) to (Ti+V) in the component (A) typically ranges from about 3 to about 1,000 and preferably ranges from about 5 to about 500.

The catalyst of this invention is suitable for the polymerization of ethylene and may also be employed for the copolymerization of ethylene with another α-olefin having 3 to 20 carbon atoms such as propylene, butene-1, isobutene, hexene-1, 4-methylpentene-1, octene-1 and or with a polyene such as butadiene and isoprene. In the copolymerization it is preferred to employ the mol ratio of the α-olefin to be copolymerized to ethylene of at most 5. According to this invention it is possible to produce polyethylene having a density of about 0.975 to about 0.910 by the homo- or co-polymerization of ethylene.

In this invention, polymerization is conducted at a temperature ranging from about 120° C. to about 320° C., preferably from about 150° C. to about 300° C. by the solution polymerization method. As the polymerization medium or solvent there can be employed aliphatic hydrocarbons such as hexane, heptane or octane; aromatic hydrocarbon such as benzene, toluene or xylene; and alicyclic hydrocarbons such as cyclohexane or methylcyclohexane. The catalyst is introduced into a reactor together with the polymerization solvent and ethylene is added at a pressure of ethylene of from about 0.1 to about 40 MPa, preferably from about 1 to about 25 MPa in an inert atmosphere and polymerized. Also it is possible to employ such a means as a stirrer for providing better contact between ethylene and the catalyst in the polymerization.

The process of the present invention can produce polyethylene having a narrow molecular weight distribution suitable for injection molding in the single stage polymerization having one polymerization zone. Also the process of this invention can produce polyethylene having a broad molecular weight distribution suitable for extrusion molding by the multistage polymerization having a plurality of polymerization zones, usually two to six polymerization zones connected in series or in parallel where the polymerization conditions such as the polymerization temperature, the concentration of hydrogen and the mol ratio of the catalyst are varied.

In order to control the molecular weight of the polymer, the temperature of the reactor may be varied or it is also possible to add hydrogen or an organic compound which can easily cause chain transfer. Furthermore, the process of this invention may be combined with a method of using a titanate as a third component for controlling the density of the polymer formed.

The present invention will now be illustrated in greater detail with reference to several Examples, but they are given for illustrative purposes only and are not be construed as limiting the invention.

In these examples MI designates a melt index of a polymer which is measured at 190° C. under a load of 2.16 Kg in accordance with ASTM D-1238. FR designates a flow ratio represented by $MI_{21.6}/MI_{2.16}$ wherein $MI_{21.6}$ is a melt index of the polymer measured at 190° C. under a load of 21.6 Kg and $MI_{2.16}$ is the melt index measured at 190° C. under a load of 2.16 Kg and is one of the criteria for the molecular weight distribution. A lower FR shows a narrower molecular weight distribution. The term "catalyst efficiency" shows the amount of polymer formed in kilogram per gram of Ti plus V.

EXAMPLE 1

(I) Synthesis of Hydrocarbon-soluble Organomagnesium Component (i)

In a 200 ml flask purged with nitrogen were charged 5 g of magnesium powder, and then 20 ml out of a mixed solution of 34.1 ml of n-octyl chloride and 56 ml of heptane were added thereto. The flask was heated and the resulting mixture was refluxed with stirring. After the reaction was started, the remaining mixed solution of n-octyl chloride and heptane was added dropwise to the flask over two hours under refluxing. After completing of the reaction, the reaction mixture was stirred further for one hour, and 10 ml of a heptane solution containing 12 mmols of $AlCl_2(On-C_4H_9)$ was added thereto and the reaction was continued at 70° C. for two hours to give an organomagnesium component solution. As a result of analysis, the composition of this complex was $Al_{0.13}Mg(n-C_8H_{17})_{2.25}(On-C_4H_9)_{0.13}$. To this organomagnesium component solution were added 10 ml of a heptane solution containing 25 mmols of methylhydropolysiloxane (viscosity: 30 centistoke) at 0° C. over 30 minutes and the temperature was gradually raised to 20° C. with stirring. The concentration of the organometal was 0.86 mol per liter of the reaction solvent.

The $AlCl_2(On-C_4H_9)$ employed was prepared by reacting aluminum powder, $AlCl_3$ and $n-C_4H_9OH$ at a mol ratio of 1:2:3 in heptane.

(II) Synthesis of Component (A)

The oxygen and moisture present inside a 250 ml flask equipped with a dropping funnel and a water-cooled reflux condenser were purged with nitrogen, and to the flask were charged 20 ml of a heptane solution containing trichlorosilane in an amount of 0.1 mol per liter of heptane and 30 ml of heptane in a nitrogen atmosphere and the temperature was raised to 70° C. Then 2.33 ml of the hydrocarbon-soluble organomagnesium component (i) and 20 ml of heptane were accurately measured and charged in the dropping funnel. Both were added drop-wise to the flask at 70° C. with stirring over 2 hours, resulting in a white suspension reaction solution. To the obtained suspension reaction solution were added 27.7 ml of a heptane solution containing 5.7 mg of titanium tetrachloride and the reaction was continued at 70° C. for one hour.

(III) Polymerization of Ethylene

In a 1 l autoclave evacuated were charged 3.8 ml of the component (A) as obtained above and 0.02 mmol of trioctyl aluminum with 0.6 l of dehydrated and deaerated octane, and then 10 mmols of hydrogen was introduced into the autoclave. While keeping the temperature of the autoclave at 190° C., ethylene was introduced into the autoclave at a pressure of 4.0 MPa and the polymerization was carried out for 50 minutes while maintaining the total pressure constant by supplying additional ethylene, resulting in 46.5 g of a polymer. The catalyst efficiency was 826 Kg/g Ti, MI was 7.2, FR was 26, the density was 0.970 g/cc, and the number of vinyl group was 0.23 per 1000 carbon atoms.

EXAMPLES 2 TO 20

Components (A) were prepared by reacting the hydrocarbon-soluble organomagnesium component (i) with the halide (ii) under the reaction conditions as set forth in Table 1 and subsequently contacting the obtained product with the compound (iii) under the reaction conditions as set forth in Table 1 in the same manner as described in Example 1. Using 4 ml of these components (A) and organoaluminum components (B) as set forth in Table 2 under the reaction conditions as set forth in Table 2, polymerization of ethylene was carried out under the polymerization conditions as set forth in Table 2 in the same manner as in Example 1. The results are shown in Table 2.

TABLE 1

| Example No. | Organomagnesium Component (i) (mmol) | Halide (ii) (mmol) | (i) + (ii) Reaction Conditions Temperature (°C.) | Time (hour) |
|---|---|---|---|---|
| 2 | $(n-C_4H_9)Mg(C_2H_5)[THF]_{0.4}$ 2.0 | $(CH_3)SiHCl_2$ 2.2 | 30 | 2 |
| 3 | $(i-C_3H_7)Mg(n-C_4H_9)[Diglym]_{0.5}$ 2.0 | $HSiCl_3$ 10.0 | 40 | 10 |
| 4 | $(i-C_4H_9)_{1.5}Mg(On-C_6H_{13})_{0.5}[N(C_2H_5)_3]_{0.06}$ 2.0 | $HSiCl_3$ 20.0 | 90 | 3 |
| 5 | $Zn_{0.6}Mg(n-C_3H_7)(n-C_9H_{19})_{2.2}[P(C_6H_5)_3]_{4.0}$ 2.0 | $B(C_2H_5)Cl_2$ 10.0 | 50 | 6 |
| 6 | $Li_{0.1}Mg(n-C_4H_9)_{1.1}(sec-C_4H_9)[S(C_2H_5)_2]_{8.0}$ 2.0 | $SiCl_4$ 80.0 | −20 | 10 |
| 7 | $Al_{10}Mg(n-C_4H_9)_{30}(n-C_8H_{17})_2[C_5H_5N]_{0.15}$ 2.0 | $SiCl_4$ 1.8 | 70 | 3 |
| 8 | $ZnMg(C_2H_5)_2(n-C_4H_9)_2[DMF]_{0.1}$ 2.0 | $B(C_2H_5)_{1.5}Cl_{1.5}$ 70.0 | −40 | 8 |
| 9 | $Al_{0.3}Mg(C_2H_5)_{0.9}(n-C_4H_9)_2[TMEDA]_{0.8}$ 2.0 | $(CH_3)SiHCl_2$ 3.0 | 70 | 1 |
| 10 | $(sec-C_4H_9)_{1.7}Mg(On-C_6H_{13})_{0.3}[O\frown O]_{0.2}$ 2.0 | $HSiCl_3$ 4.0 | 100 | 0.5 |
| 11 | $Al_{0.25}Mg(C_2H_5)_{0.75}(n-C_{10}H_{21})_2[18\text{-crown-}6]_{0.3}$ 2.0 | $(C_2H_5)SiHCl_2$ 6.0 | 50 | 8 |
| 12 | $B_{1.2}Mg(sec-C_4H_9)_2(C_6H_5)_{3.0}(SC_3H_7)_{0.4}[P(C_2H_5)_3]_{12}$ 2.0 | $(C_2H_5)SbCl_2$ 0.2 | 120 | 1.5 |
| 13 | $Al_{0.5}Mg(n-C_6H_{13})_{3.5}[DABCO]_{0.6}$ 2.0 | $HSiCl_3$ 1.0 | 0 | 20 |
| 14 | $Al_2Mg(C_2H_5)_6(n-C_7H_{15})_2[CH_3CN]_{0.05}$ 2.0 | $SbCl_5$ 12.0 | 70 | 2 |
| 15 | $(n-C_{10}H_{21})_{1.3}Mg(SC_4H_9)_{0.7}(CH_3OC_4H_9)_8$ 2.0 | $SnCl_3(OC_2H_5)$ 30.0 | 90 | 4 |
| 16 | $B_{0.8}Mg(C_2H_5)_4(On-C_3H_7)_{0.4}[HMPA]_{0.06}$ 2.0 | $GeCl_4$ 36.0 | 60 | 6 |
| 17 | $Al_{0.4}Mg(n-C_5H_{11})_{3.0}[OSi(CH_3)_2]_{0.2}[O(C_2H_5)_2]_{1.2}$ 2.0 | $HSiCl_3$ 1.4 | 60 | 5 |
| 18 | $Be_{1.1}Mg(C_2H_5)_{4.2}[DMSO]_6$ 2.0 | $SnCl_4$ 140.0 | 110 | 1 |
| 19 | $Mg(n-C_8H_{17})_{2.6}Cl_{0.4}[O(C_2H_5)_2]_{0.4}$ 5.0 | $HSiCl_3$ 25.0 | 60 | 2 |

TABLE 1-continued

| | | | | |
|---|---|---|---|---|
| 20 | $Al_{0.7}Mg(n-C_4H_9)_{3.4}Cl_{0.7}[O\diagup\diagdown O]_4$ 5.0 | $CH_3SiCl_3$ 80.0 | 90 | 1 |

| Example No. | Compound (iii) of Titanium and/or Vanadium (mmol) | Concentration of Titanium plus Vanadium (mmol per liter of solvent) | [(i)+ (ii)]+ (iii) Reaction Conditions Temperature (°C.) | Time (hour) |
|---|---|---|---|---|
| 2 | $TiCl_2$ 0.133 | 1.33 | 60 | 2 |
| 3 | $TiCl_3(Oi-C_3H_7)$ 0.167 | 1.67 | 30 | 2 |
| 4 | $TiCl_3(On-C_4H_9)$ 0.0067 | 0.07 | 65 | 4 |
| 5 | $TiCl_4 + VOCl_3$ 0.0063 0.0125 | 0.19 | 60 | 2 |
| 6 | $Ti(Oi-C_3H_7)_4$ 0.0067 | 0.07 | 40 | 3 |
| 7 | $TiBr_4$ 0.071 | 0.71 | 60 | 5 |
| 8 | $TiCl_3(OC_6H_4CH_3)$ 0.0054 | 0.05 | 100 | 2 |
| 9 | $TiCl_4$ 0.0307 | 0.31 | 75 | 1 |
| 10 | $TiCl_{3.5}(On-C_4H_9)_{0.5}$ 0.0235 | 0.24 | 85 | 5 |
| 11 | $TiCl_4 + VOCl_3$ 0.050 0.0167 | 0.67 | 60 | 3 |
| 12 | $TiCl_2(Oi-C_3H_7)_2$ 0.0076 | 0.08 | −10 | 4 |
| 13 | $TiCl_4$ 0.0571 | 0.57 | 90 | 10 |
| 14 | $TiCl(On-C_4H_9)_3$ 0.133 | 1.33 | 120 | 2 |
| 15 | $TiCl_3(O_2CCH_3) + VOCl_2$ 0.2 0.02 | 2.20 | 10 | 6 |
| 16 | $TiCl_3(Oi-C_3H_7)$ 0.138 | 1.38 | 60 | 2 |
| 17 | $TiCl_4 + VOCl_3$ 0.050 0.050 | 1.00 | 0 | 15 |
| 18 | $Ti(On-C_4H_9)_4$ 0.238 | 2.38 | 60 | 1 |
| 19 | $TiCl_4$ 0.06 | 0.63 | 90 | 2 |
| 20 | $TiCl_4 + VOCl_3$ 0.06 0.08 | 1.40 | 70 | 5 |

Note:
THF: tetrahydrofuran
DMF: dimethylformamide

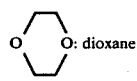: dioxane

DABCO: 1,4-diazabicyclo [2,2,2] octane
DMSO: dimethyl sulfoxide
Diglam: diethylene glycol dimethyl ether
TMEDA: N,N,N',N'-tetramethylenediamine
HMPA: hexamethylphosphoric triamide

TABLE 2

| | | | Polymerization Conditions | | | Results of Polymerization | | |
|---|---|---|---|---|---|---|---|---|
| Example No. | Organoaluminum Compound (B) | (mmol) | Polymerization Temperature (°C.) | Ethylene Pressure (MPa) | $H_2$ (mmol) | Catalyst Efficiency [Kg/g (Ti + V)] | Polyethylene MI | FR |
| 2 | $Al(C_2H_5)_3$ | 0.053 | 210 | 3.0 | 15 | 772 | 2.6 | 25 |
| 3 | $Al(n-C_{10}H_{21})_3$ | 0.040 | 190 | 3.0 | 15 | 729 | 2.6 | 33 |
| 4 | $Al(n-C_8H_{17})_3$ | 0.107 | 200 | 2.0 | 20 | 538 | 6.1 | 31 |
| 5 | $Al(C_2H_5)_3$ | 0.150 | 180 | 2.0 | 20 | 570 | 8.3 | 26 |
| 6 | $Al(C_2H_5)_{2.5}Cl_{0.5}$ | 0.214 | 160 | 4.0 | 30 | 538 | 4.2 | 22 |
| 7 | $Al(C_2H_5)_3$ | 0.012 | 170 | 3.5 | 10 | 375 | 0.5 | 38 |
| 8 | Aluminum isoprenyl | 0.118 | 180 | 2.5 | 25 | 390 | 10.6 | 31 |
| 9 | $Al(C_2H_5)_3$ | 0.307 | 210 | 3.0 | 15 | 810 | 3.1 | 22 |
| 10 | $Al(i-C_4H_9)_3$ | 0.141 | 230 | 4.0 | 15 | 615 | 25.3 | 35 |
| 11 | $Al(n-C_4H_9)_3$ | 0.107 | 190 | 1.5 | 20 | 693 | 0.9 | 33 |
| 12 | $Al(i-C_4H_9)_2Cl$ | 0.161 | 170 | 2.0 | 25 | 370 | 8.7 | 25 |
| 13 | $Al(i-C_4H_9)_3$ | 0.288 | 200 | 2.5 | 15 | 700 | 0.4 | 23 |

TABLE 2-continued

| Example No. | Organoaluminum Compound (B) (mmol) | | Polymerization Conditions | | | Results of Polymerization | | |
|---|---|---|---|---|---|---|---|---|
| | | | Polymerization Temperature (°C.) | Ethylene Pressure (MPa) | $H_2$ (mmol) | Catalyst Efficiency [Kg/g (Ti + V)] | Polyethylene | |
| | | | | | | | MI | FR |
| 14 | $Al(n-C_4H_9)_{2.7}[OSiH(CH_3)_2]_{0.3}$ | 3.19 | 160 | 3.5 | 30 | 372 | 1.2 | 34 |
| 15 | Aluminum myrcenyl | 5.42 | 190 | 3.5 | 25 | 389 | 11.5 | 23 |
| 16 | $Al(C_2H_5)_3$ | 1.66 | 180 | 2.0 | 20 | 469 | 15.2 | 31 |
| 17 | $AlH(n-C_6H_{13})_2$ | 0.320 | 190 | 3.0 | 20 | 790 | 8.7 | 20 |
| 18 | $Al(i-C_4H_9)_{2.6}(OC_2H_5)_{0.4}$ | 0.038 | 200 | 4.0 | 30 | 359 | 3.5 | 24 |
| 19 | $Al(C_2H_5)_3$ | 0.250 | 200 | 4.0 | 20 | 485 | 6.3 | 39 |
| 20 | $Al(C_2H_5)_3$ | 0.364 | 200 | 4.0 | 20 | 329 | 1.4 | 27 |

EXAMPLES 21 TO 25

(I) Synthesis of Component (A)

2 mmols of $Al_{0.2} Mg(C_2H_5)_{0.6}(n-C_4H_9)_2$ were mixed with a siloxane compound as set forth in Table 3 to form a hydrocarbon-soluble organomagnesium component (i). The component (A) was prepared in the same manner as in Example 1 except that the obtained component (i), the halide (ii), the compound (iii) and the reaction conditions as set forth in Table 3 were used.

(II) Polymerization of Ethylene

Using 2.5 ml of the obtained component (A), the organoaluminum component (B) and the polymerization conditions as set forth in Table 4, polymerization of ethylene was conducted in the same manner as in Example 1. The results are shown in Table 4.

Example 1 and 0.03 mmol of trioctyl aluminum. After 80 mmols of hydrogen were introduced into the autoclave and the temperature was raised to 220° C., 1.2 mols of ethylene were further polymerized at a pressure of ethylene of 2.0 MPa, resulting in a polymer having a MI of 2.5 and a FR of 96.

EXAMPLE 27

In a 1 l autoclave evacuated were charged 2.0 ml of the same component (A) as in Example 1 and 0.03 mmol of tridecyl aluminum with 0.2 l of dehydrated and deaerated hexane. After 5 mmols of hydrogen were introduced into the autoclave, ethylene was added up to a pressure of 6.0 MPa and the temperature was raised of 270° C., and polymerization of ethylene was conducted for 10 minutes, resulting in 40 g of a polymer having a MI of 9.2 and a FR of 27.

TABLE 3

| Example No. | Electron Donor Siloxane Compound (mmol) | Halide (ii) (mmol) | (i) + (ii) Reaction Conditions | | Compound (iii) (mmol) | Concentration of Titanium plus Vanadium (mmol per liter of solvent) | [(i) + (ii)] + (iii) Reaction Conditions | |
|---|---|---|---|---|---|---|---|---|
| | | | Temperature (°C.) | Time (hour) | | | Temperature (°C.) | Time (hour) |
| 21 | Hexamethyldisiloxane 1.0 | $HSiCl_3$ 3.8 | 80 | 2 | $TiCl_4$ 0.0855 | 0.86 | 70 | 1 |
| 22 | Methylhydropolysiloxane (viscosity*: 10) 0.5 | $(n-C_3H_7)SiHCl_2$ 3.0 | 70 | 2 | $TiCl_4$ 0.0202 | 0.20 | 60 | 1 |
| 23 | Dimethylpolysiloxane (viscosity*: 20) 2.0 | $HSiCl_3$ 2.0 | 100 | 4 | $TiCl_4 + VCl_4$ 0.072 0.12 | 1.92 | 90 | 3 |
| 24 | Dihydrotetramethyl-disiloxane 3.5 | $C_2H_5BCl$ 2.2 | 60 | 2 | $VCl_4$ 0.0307 | 0.31 | 120 | 3 |
| 25 | Cyclic methylhydrotetra-siloxane 0.8 | $Si(C_2H_5)Cl_3$ | 40 | 6 | $TiCl_3(On-C_4H_9)$ 0.11 | 0.11 | 100 | 2 |

Note
*: centistokes

TABLE 4

| Example No. | Organoaluminum Compound (B) (mmol) | | Polymerization Conditions | | | Results of Polymerization | | |
|---|---|---|---|---|---|---|---|---|
| | | | Polymerization Temperature (°C.) | Ethylene Pressure (MPa) | $H_2$ (mmol) | Catalyst Efficiency [Kg/g (Ti + V)] | Polyethylene | |
| | | | | | | | MI | FR |
| 21 | $Al(C_2H_5)_3$ | 0.419 | 190 | 2.5 | 20 | 762 | 12.5 | 24 |
| 22 | $Al(C_2H_5)_3$ | 0.016 | 190 | 2.5 | 20 | 724 | 3.2 | 28 |
| 23 | $Al(C_2H_5)_3$ | 0.072 | 190 | 2.5 | 30 | 718 | 7.2 | 23 |
| 24 | $Al(C_2H_5)_3$ | 0.282 | 190 | 2.5 | 30 | 577 | 1.2 | 37 |
| 25 | $Al(i-C_4H_9)_{2.5}Cl_{0.5}$ | 0.153 | 180 | 3.0 | 40 | 546 | 32.6 | 29 |

EXAMPLE 26

In the same manner as in Example 1, 1.5 mols of ethylene were polymerized at 140° C. at a pressure of ethylene of 4.0 MPa in the presence of 3 mmols of hydrogen by using 2.0 ml of the same component (A) as in

EXAMPLES 28 TO 37

A component (A) was prepared in the same manner as in Example 1 except that 2.0 mmols of $Al_{0.05}Mg(C_2H_5)_{1.05}(n-C_4H_9)[O(n-C_4H_9)_2]_{0.3}$, 1.8 mmols of SiHCH$_3$ and 0.125 mmol of TiCl$_4$ at a concentration of titanium of 1.25 mmols per liter of the reaction solvent were employed.

In a 1 l autoclave evacuated were charged 4 ml of the obtained component (A) and 0.16 mmol of Al(i-C$_4$H$_9$)$_3$ with 0.6 l of dehydrated and deaerated methylcyclohexane. After 10 mmols of hydrogen and an olefin or a polyene as set forth in Table 5 were introduced into the autoclave, the temperature was raised to the one as set forth in Table 5 and then ethylene was added up to a pressure of 3.0 MPa. Until 1.5 mmols of ethylene was polymerized, copolymerization of the olefin or polyene with ethylene was continued while maintaining the total pressure constant by supplying additional ethylene. The results are shown in Table 5.

TABLE 5

| Example No. | αOlefin or Polyene | (mmol) | Polymerization Temperature (°C.) | Products MI | FR | Density (g/cc) |
|---|---|---|---|---|---|---|
| 28 | Butene-1 | 100 | 200 | 2.5 | 27 | 0.936 |
| 29 | Butene-1 | 200 | 160 | 8.7 | 26 | 0.921 |
| 30 | Propylene | 50 | 160 | 1.0 | 25 | 0.946 |
| 31 | Hexene-1 | 70 | 190 | 1.6 | 29 | 0.939 |
| 32 | Octene-1 | 500 | 190 | 9.7 | 28 | 0.918 |
| 33 | 4-Methylpentene-1 | 150 | 200 | 6.5 | 29 | 0.936 |
| 34 | 4-Methylpentene-1 | 200 | 170 | 14.2 | 26 | 0.932 |
| 35 | Isobutene | 1000 | 170 | 35.2 | 24 | 0.915 |
| 36 | Butadiene | 30 | 210 | 6.4 | 23 | 0.949 |
| 37 | Isoprene | 250 | 180 | 8.9 | 26 | 0.937 |

COMPARATIVE EXAMPLE 1

(I) Synthesis of Component (A)

The oxygen and moisture present inside a 250 ml flask equipped with a dropping funnel and a water-cooled reflex condenser were purged with nitrogen, and to the flask were charged 50 ml of a heptane solution containing trichlorosilane in a nitrogen atmosphere and the temperature was raised at 50° C. Then 50 ml of a heptane solution containing 50 mmols of Al$_{0.17}$Mg(C$_2$H$_5$)$_{0.51}$(n-C$_4$H$_9$)$_2$[O(n-C$_4$H$_9$)$_2$]$_{0.6}$ were accurately measured, charged in the dropping funnel and added dropwise to the flask at 50° C. over 2 hours with stirring, resulting in a white suspension reaction solution. Then the white solid was separated by filtration, washed and dried. In a pressure-resistant ampoule purged with nitrogen were charged 2 g of the obtained white solid and 30 ml of titanium tetrachloride and these substances were contacted at 130° C. for 2 hours with stirring. Then the obtained solid component was separated. As the result of analysis, the solid component contained 2.6% by weight of titanium.

(II) Polymerization of Ethylene

Polymerization of ethylene was carried out under the same polymerization conditions as in Example 1 except that 20 mg of the obtained solid component and 0.4 mmol of triisobutyl aluminum were used and that the polymerization temperature of 160° C. was employed. As a result, 102 g of polyethylene were obtained. The catalyst efficiency was 197 Kg/g Ti, MI was 3.6, FR was 29.

COMPARATIVE EXAMPLE 2

Polymerization of ethylene was carried out under the same polymerization conditions as in Comparative Example 1 except that the polymerization temperature of 190° C. was used. As a result, 0.7 g of polyethylene was obtained and the catalyst efficiency was 1.3 Kg/g Ti.

COMPARATIVE EXAMPLE 3

(I) Synthesis of Component (A)

The procedure of Example 1 for preparing the component (A) was repeated except that the 5.7 mg of titanium tetrachloride was replaced by 380 mg of titanium tetrachloride. The atomic ratio of Mg to Ti was 0.88.

(II) Polymerization of Ethylene

Polymerization of ethylene was conducted in the same manner as in Example 1 except that 5.0 ml of the obtained component (A) and 0.3 mmol of Al(C$_2$H$_5$)$_3$ were used. As a result, a very small amount of polyethylene was formed.

EXAMPLES 38 TO 43 & COMPARATIVE EXAMPLE 4

(I) Synthesis of Component (A)

A component (A) was prepared in the same manner as in Example 1 except that 2 mmols of Al$_{0.5}$Mg(C$_2$H$_5$)$_{1.5}$(n-C$_4$H$_9$)$_2$[(iso-C$_5$H$_{11}$)$_2$O]$_{0.2}$, 2 mmols of HSiCl$_3$, 0.10 mmol of TiCl$_4$ and 0.08 mmol of VOCl$_3$ at a concentration of titanium of 0.8 mmol per liter of the reaction solvent were employed.

(II) Polymerization of Ethylene

Polymerization of ethylene was conducted in the same manner as in Example 1 by using 2.0 ml of the above component (A) and Al(n-C$_4$H$_9$)$_3$ in an amount as set forth in Table 6. The results are shown in Table 6.

EXAMPLES 43 TO 46

Polymerization of ethylene was conducted in the same manner as in Example 1 by using 4 ml of the same component (A) as obtained in Example 1 and an organometal component (B) as set forth in Table 7. The results are shown in Table 7.

TABLE 6

| Example No. | Al(n-C$_4$H$_9$)$_3$ (mmol) | Polymerization Temperature (°C.) | Results of Polymerization Catalyst Efficiency [Kg/g (Ti + V)] | Polyethylene MI | FR |
|---|---|---|---|---|---|
| 38 | 0.18 | 160 | 1206 | 5.9 | 22 |
| 39 | 2.16 | 190 | 865 | 12.5 | 28 |
| 40 | 0.11 | 190 | 1189 | 6.2 | 24 |
| 41 | 0.01 | 190 | 126 | 6.3 | 23 |
| 42 Comparative Example No. | 0.04 | 210 | 984 | 7.9 | 25 |

TABLE 6-continued

| Example No. | Al(n-C₄H₉)₃ (mmol) | Polymerization Temperature (°C.) | Results of Polymerization | | |
|---|---|---|---|---|---|
| | | | Catalyst Efficiency [Kg/g (Ti + V)] | Polyethylene MI | FR |
| 4 | 0 | 190 | 8 | — | — |

TABLE 7

| Example No. | Organometal Component (B) (mmol) | Results of Polymerization | | |
|---|---|---|---|---|
| | | Catalyst Efficiency (Kg/g Ti) | Polyethylene MI | FR |
| 43 | B(C₂H₅)₂.₈Cl₀.₂ 1.0 | 431 | 6.3 | 26 |
| 44 | Al₀.₂Mg(n-C₄H₉)₂.₆ 0.5 | 687 | 0.9 | 32 |
| 45 | Zn(n-C₄H₉)₂ 0.8 | 504 | 1.9 | 32 |
| 46 | Zn₀.₅Mg(C₂H₅)₂(n-C₄H₉) 0.1 | 695 | 9.8 | 31 |

It will be appreciated that the instant specification and examples are set forth by way of illustration and not limitation, and that various modifications and changes may be made without departing from the spirit and scope of the present invention.

What is claimed is:

1. A process for polymerizing an α-olefin comprising contacting the olefin in liquid phase at a temperature of about 120° to 320° C. with a catalyst comprising a component (A) and an organometal component (B), the component (A) being produced by reacting a hydrocarbon-soluble organomagnesium component (i) of the formula, $$M_\alpha MgR_p^1 R_q^2 X_r^1 X_s^2 D_t$$

wherein
α, p, q, r and s each independently is 0 or a number greater than 0,
t is about 0.05 to about 10,
$p+q+r+s = m\alpha + 2$,
$0 \leq (r+s)/(\alpha+\beta) < 2$,
m is the valence of M,
M is a metal of the 1st to 3rd groups of the Periodic Table,
$R^1$ and $R^2$ each independently is a hydrocarbon group having 1 to 20 carbon atoms,
$X^1$ and $X^2$ each independently is a hydrogen atom, a halogen atom or an organic electronegative group containing 0, N or S,
D is an electron donor,
with (ii) a halide boron, silicon, germanium, tin, phosphorus, antimony, bismuth or zinc, and contacting the product of (i)+(ii) in an inert reaction solvent with (iii) a compound of tetravalent titanium and/or a compound of pentavalent or tetravalent vanadium at a concentration of titanium plus vanadium of at most about 2 mols per liter of the inert reaction solvent, the atomic ratio of Mg/(Ti+V) in (A) being about 3 to about 500.

2. A process of claim 1, wherein M in the organomagnesium component (i) of the component (A) is lithium, berylium, boron, aluminum or zinc metal.

3. A process of claim 2, wherein M in the organomagnesium component (i) of the component (A) is aluminum metal.

4. A process of claim 1, wherein α in the organomagnesium component (i) is $0 \leq \alpha \leq 1.5$.

5. A process of claim 4, wherein α in the organomagnesium component (i) is $0 < \alpha \leq 1$.

6. A process of claim 1, wherein $X^1$ and $X^2$ in the organomagnesium component (i) each independently is $OR^3$, $OSiR^4R^5R^6$, $NR^7R^8$ or $SR^9$ wherein $R^3$, $R^7$, $R^8$ and $R^9$ each independently is a hydrocarbon group having 1 to 15 carbon atoms and $R^4$, $R^5$ and $R^6$ each independently is a hydrogen atom or a hydrocarbon group having 1 to 15 carbon atoms.

7. A process of claim 6, wherein $X^1$ and $X^2$ in the organomagnesium component (i) each independently is $OR^3$.

8. A process of claim 6, wherein $X^1$ and $X^2$ in the organomagnesium component (i) each independently is $OSiR^4R^5R^6$.

9. A process of claim 1, wherein at least one of $X^1$ and $X^2$ is a halogen atom and the amount of $X^1$ and $X^2$ is $(r+s)/(\alpha+1) \leq 1$.

10. A process of claim 1, wherein the electron donor represented by D is an electron donative organic compound containing O, N, S or P.

11. A process of claim 10, wherein the electron donative organic compound is an ether, a siloxane, a tertiary amine, a nitrile, an amide, a pyridine, a thioether, a sulfoxide or a phosphine.

12. A process of claim 11, wherein the electron donative organic compound is an ether.

13. A process of claim 11, wherein the electron donative organic compound is a siloxane.

14. A process of claim 11, wherein the electron donative organic compound is an amine.

15. A process of claim 1, wherein the polymerization temperature is about 200° C.

16. A process of claim 1, wherein t in the organomagnesium component (i) is about 0.2 to about 2.

17. A process of claim 9, wherein t in the organomagnesium component (i) is $t/(r+s) \geq 1$.

18. A process of claim 1, wherein the halide (ii) is a chloride of boron, silicon or germanium.

19. A process of claim 18, wherein the halide (ii) is a chlorosilane.

20. A process of claim 1, wherein (iii) the compound of titanium and/or the compound of vanadium contains at least one chlorine atom.

21. A process of claim 1, wherein the reaction between the component (i) and the halide (ii) is conducted at a temperature of about $-50°$ to about 150° C.

22. A process of claim 1, wherein the mol ratio of the halide (ii) to the component (i) is about 0.01 to about 100.

23. A process of claim 1, wherein the mol ratio of the halide (ii) to the component (i) is about 0.1 to about 20.

24. A process of claim 1, wherein the contact of the reaction product of (i)+(ii) with (iii) the compound of titanium and/or the compound of vanadium is conducted at a temperature of about $-50°$ to about 150° C.

25. A process of claim 24, wherein the contact of the reaction product of (i)+(ii) with (iii) the compound of titanium or (iii) the compound of titanium plus the compound of vanadium is conducted at a temperature of from about 0° to about 95° C.

26. A process of claim 1, wherein the atomic ratio of Mg/(Ti+V) in the component (A) is from about 5 to about 200.

27. A process of claim 26, wherein the atomic ratio of Mg/(Ti+V) in the component (A) is from about 10 to about 100.

28. A process of claim 1, wherein the reaction product of the component (i) and the halide (ii) is contacted with (iii) the compound of titanium and/or the compound of vanadium at a concentration of titanium plus vanadium of about 0.01 mmol to about 900 mmols per liter of the inert reaction solvent.

29. A process of claim 1, wherein the organometal component (B) is an organoaluminum compound, an organoboron compound, an organozinc compound or an organomagnesium compound.

30. A process of claim 29, wherein the organometal component (B) is an organoaluminum compound.

31. A process of claim 30, wherein the organoaluminum compound is a trialkylaluminum, an alkylaluminum halide, an alkylaluminum alkoxide, an alkylaluminum siloxide and a reaction product of a trialkylaluminum and a conjugated diene.

32. A process of claim 1, wherein the mol ratio of the organometal compound (B) to (Ti+V) in the component (A) is about 3 to about 1000.

33. A process of claim 1, wherein the α-olefin is ethylene.

34. A process of claim 33, wherein the polymerization of ethylene is carried out at a partial pressure of ethylene of from about 1 to about 25 MPa at a polymerization temperature of about 150° to about 300° C.

35. A process of claim 1, wherein copolymerization of ethylene with an α-olefin other than ethylene or a polyene.

36. A process of claim 35, wherein the α-olefin other than ethylene is a $C_{3-20}$ α-olefin.

37. A process of claim 36, wherein the polyene is butadiene or isoprene.

38. A process of claim 35, wherein the mol ratio of the α-olefin or polyene to ethylene is at most 5.

39. A process of claim 1, wherein the polymerization of an α-olefin is conducted in a plurality of polymerization zones.

40. A catalyst useful for polymerizing an α-olefin comprising a component (A) and an organometal component (B), the component (A) being produced by reacting a hydrocarbon-soluble organomagnesium component (i) of the formula $$M_\alpha MgR^1_p R^2_q X^1_r X^2_s D_t$$

wherein

α, p, q, r and s each independently is 0 or a number greater than 0, t is about 0.05 to about 10, $p+q+r+s = m\alpha + 2$, $0 \leq (r+s)/(\alpha+\beta) < 2$, m is the valence of M, M is a metal of the 1st to 3rd groups of the Periodic Table, $R^1$ and $R^2$ each independently is a hydrocarbon group having 1 to 20 carbon atoms, $X^1$ and $X^2$ each independently is a hydrogen atom, a halogen atom or an organic electronegative group containing O, N or S, D is an electron donor, with (ii) a halide boron, silicon, germanium, tin, phosphorus, antimony, bismuth or zinc, and contacting the product of (i)+(ii) in an inert reaction solvent with (iii) a compound of tetravalent titanium and/or a compound of pentavalent or tetravalent vanadium at a concentration of titanium plus vanadium of at most about 2 mols per liter of the inert reaction solvent, the atomic ratio of Mg/(Ti+V) in (A) being about 3 to about 500.

* * * * *

UNITED STATES PATENT AND TRADEMARK OFFICE
CERTIFICATE OF CORRECTION

PATENT NO. : 4,335,229
DATED : Jun. 15, 1982
INVENTOR(S) : Hisaya Sakurai et al

It is certified that error appears in the above—identified patent and that said Letters Patent is hereby corrected as shown below:

Column 19, line 38, Insert --polymerization is a-- after "wherein".

Column 20, line 3, Delete "36" and insert --35--.

Signed and Sealed this

Fifth Day of October 1982

[SEAL]

Attest:

Attesting Officer

GERALD J. MOSSINGHOFF

Commissioner of Patents and Trademarks